April 20, 1937.  E. E. HEDENE  2,077,997
COMBINED WRENCH AND LOCKING MEMBER
Filed Oct. 1, 1934
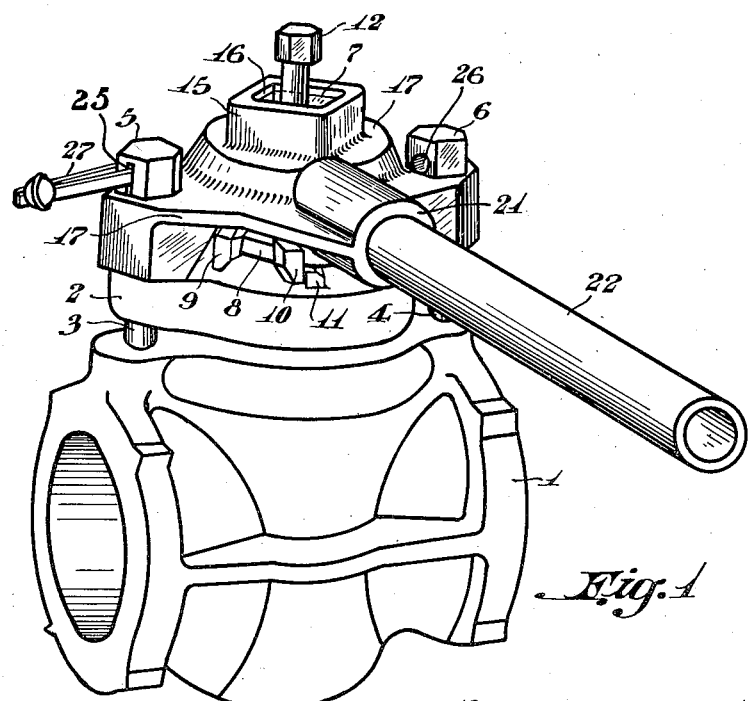
Fig. 1
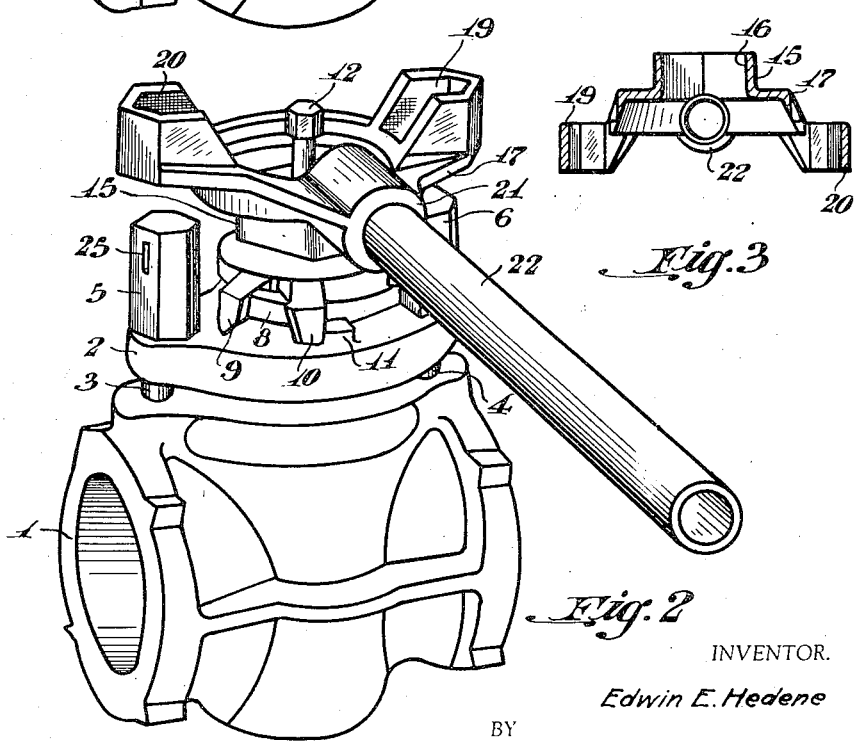
Fig. 2
Fig. 3
INVENTOR.
Edwin E. Hedene
BY
Strauch & Hoffman
ATTORNEYS Patented Apr. 20, 1937

2,077,997

UNITED STATES PATENT OFFICE 2,077,997

COMBINED WRENCH AND LOCKING MEMBER

Edwin E. Hedene, Oakland, Calif., assignor to Merco Nordstrom Valve Company, Pittsburgh, Pa., a corporation of Delaware Application October 1, 1934, Serial No. 746,447

5 Claims. (Cl. 137—111)

This invention relates to locking mechanisms for valves, and more particularly relates to a combined wrench and locking member for plug valves whereby the valve can be locked in any desired position to prevent unauthorized tampering therewith.

Many devices heretofore have been proposed to lock valves including complicated covers which prevent unauthorized tampering but such structures have the disadvantage that in general they are cumbersome to handle and require too much time for their removal or adjustment in place, and they are easily misplaced and lost.

According to the present invention, I provide a combined wrench and locking member which, when used as a locking device, effectively prevents tampering or operation of the valve, and which can be readily removed and used as a wrench for operating the valve. In its preferred embodiment, the invention comprises a member which non-rotatably engages the operating stem of the valve in operating as well as locking positions, and has integral therewith one or more offset portions or flanges having recesses therein to receive at least one of the cover or gland nuts or bolts of the valve or other suitable means with which they may interlock. The member is secured in locked position by any suitable means, such as, a padlock which passes through a suitable opening in one of the gland or cover nuts, or by a wire and seal which may be passed through one of the gland or cover nuts, or by both.

Accordingly, it is an object of the present invention to provide a locking member for valves which is easily removed or placed in position, and effectively prevents unauthorized operation of the valve.

A further object of the invention is the provision of a combined wrench and locking member, this structure acting as a wrench in one position and as a locking member in another position.

Another object is the provision of a combined wrench and locking member which is simple in construction and inexpensive to manufacture, and is not easily lost when not in use.

These and other objects of the invention will be apparent from a consideration of the following specification taken in connection with the annexed drawing and in which:

Figure 1 is a perspective view showing the apparatus employed as a locking member, a conventional plug valve being shown in outline.

Figure 2 is a view similar to Figure 1, the novel apparatus being used as an operating wrench.

Figure 3 is a vertical section through the body of the improved device looking toward the handle.

Referring to the drawing, there is shown in outline a plug valve 1 having a gland 2 secured to the top thereof by stud bolts 3 and 4 and the nuts 5 and 6. Surrounding the stem 7 of the valve is a collar 8 which carries the stops 9 and 10 cooperating with two stops on the gland to limit rotation of the valve plug to 90°. Only one stop 11 on the gland is shown. The valve seating surfaces are adapted to be lubricated by a lubricant screw 12 threaded into the hollow stem.

The improved apparatus comprises a body 15 adapted to fit over the operating stem of the valve and having a square hole 16 therethrough. This hole however may be of any other non-circular form or may be circular, in which case any suitable means is provided to interlock the valve stem and wrench to permit proper operation thereby. However, the non-circular stem is preferred because of its simplicity. The body 15 has a depending and outwardly extending flange 17 adjacent the ends of which are formed the recesses 19 and 20 for receiving the gland or cover nuts. The flange 17 has a thickened circular portion 21 which is adapted to receive a handle 22, and this handle may be fastened to the flange by a rivet or any other suitable means, or it may be left loose in its socket. This handle may be disposed at any suitable angle to the body.

Referring to Figure 1 in which the device is shown in locked position, the recesses 19 and 20 receive the nuts 5 and 6 which may be of special construction and are elongated sufficiently to cooperate with the recesses. If desired, suitable means may be provided on portions of the valve for locking engagement with the wrench, whether or not the valve is of a type utilizing a bolted packing gland as herein shown. The nut 5 has a slot 25 therethrough and for sealing the valve against tampering, a wire or metal strip 27 is inserted through this slot and is sealed by an ordinary compressible lead seal. The nut 6 has a hole bored transversely therethrough, and this nut may be sealed by passing a padlock through the hole 26 therein. When so sealed the valve stem cannot be turned for opening or closing the valve. If desired, bolts having suitable shaped heads may be substituted for the nuts and studs shown.

In Figure 2 the device is shown in use as a wrench. For use in this manner the sealing strip 27, or the padlock, if one is used, is removed, the device lifted off, and is inverted to the position shown in Figure 2, the body 15 fitting over the valve stem 7. In this position the flange 17 and recesses 19 and 20 are offset above the two nuts 5 and 6 so that they do not interfere with rotation of the valve stem. After rotating the valve to the desired position the device can be removed and inverted back to its position shown in Figure 1, whereupon the valve can be locked in position as previously described.

It will be understood that where the term bolt head is used in the claims this term covers the equivalent structure of a stud and nut or a cap screw or the like.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In combination, a valve casing, a rotatable valve member therein having an operating stem extending from the casing, a cover surrounding said stem, bolts for securing the cover to the casing, a separate locking member non-rotatably engaging said stem and having an offset portion recessed to receive the head of at least one of said bolts, and means to lock the bolt head and locking member against removal.

2. In combination, a valve casing, a rotatable valve member therein having an operating stem extending from the casing, a cover surrounding said stem, bolts for securing the cover to the casing, a separate locking member non-rotatably engaging said stem and having an offset flange with apertures therein to receive the heads of said bolts, and means to lock the bolt heads and locking member against removal.

3. In combination, a valve casing, a rotatable valve member therein having an operating stem extending from the casing, a cover surrounding said stem, a reversible operating member non-rotatably engaging said stem, bolts for securing said cover to said casing and having elongated heads extending into the plane of operation of the portion of said operating member engaging said stem, said operating member having a portion offset to pass the bolt heads in operating position and a recess in said offset portion to receive the head of at least one of said bolts when said operating member is in inverted position, and means to lock the bolt head and operating member against removal in the latter position.

4. The combination as defined in claim 3 wherein the operating member has a socket formed therein to receive an operating handle.

5. In combination, a valve casing, a rotatable valve member therein having an operating stem extending from said casing, a cover surrounding said stem, a reversible operating member non-rotatably engaging said stem, and arranged to rotate said stem in one position and lock said stem against rotation in reversed position, said operating member being provided with an offset portion having a recess therein, and bolts to secure said cover to said casing, at least one of said bolts having a head of sufficient length to project through and beyond said recess when said operating member is in locking position, said recess and bolt head being substantially congruent but non-circular in shape whereby said bolt head cannot be rotated without removing said operating member.

EDWIN E. HEDENE.